United States Patent [19]

Vinatzer

[11] 4,087,186
[45] May 2, 1978

[54] LIGHT MEASURING CIRCUIT FOR A PHOTOMETER

[75] Inventor: Alex Vinatzer, Brixen, Italy

[73] Assignee: Durst AG. Fabrik Fototechnischer Apparate, Bolzano-Bozen, Italy

[21] Appl. No.: 728,847

[22] Filed: Oct. 1, 1976

[30] Foreign Application Priority Data

Oct. 16, 1975 Italy .................................. 4849 A/75

[51] Int. Cl.² ............................................. G01J 1/46
[52] U.S. Cl. ................................. 356/226; 250/211 R
[58] Field of Search ............... 356/223, 226, 229, 230; 250/211 R, 213 A, 214 P; 354/24, 50, 51

[56] References Cited

U.S. PATENT DOCUMENTS 3,892,493  7/1975  Pallingen ........................ 356/226

OTHER PUBLICATIONS

Allen, et al.; Applied Optics, vol. 11, No. 2, Feb. 1972, pp. 476–477.

*Primary Examiner*—Samuel W. Engle
*Assistant Examiner*—Donald P. Walsh
*Attorney, Agent, or Firm*—Connolly and Hutz

[57] ABSTRACT

In a photometric circuit a reference current is supplied into the input of the logarithmic amplifier at the same time the signal compensating the error originating in the photocell is supplied to the circuit. The reference current corresponds to the current which would occur in the photocell for the lowest measurable intensity of illumination. A sum-and-difference amplifier has one of its inputs supplied by the output of the logarithmic amplifier and its second input is supplied by a reference voltage. The control loop contains a storage capacitor connected after the sum-and-difference amplifier and an impedance converter connected after the storage capacitor. The compensating and reference currents are controlled by switches synchronized with a light chopper mounted in front of the photocell.

10 Claims, No Drawings

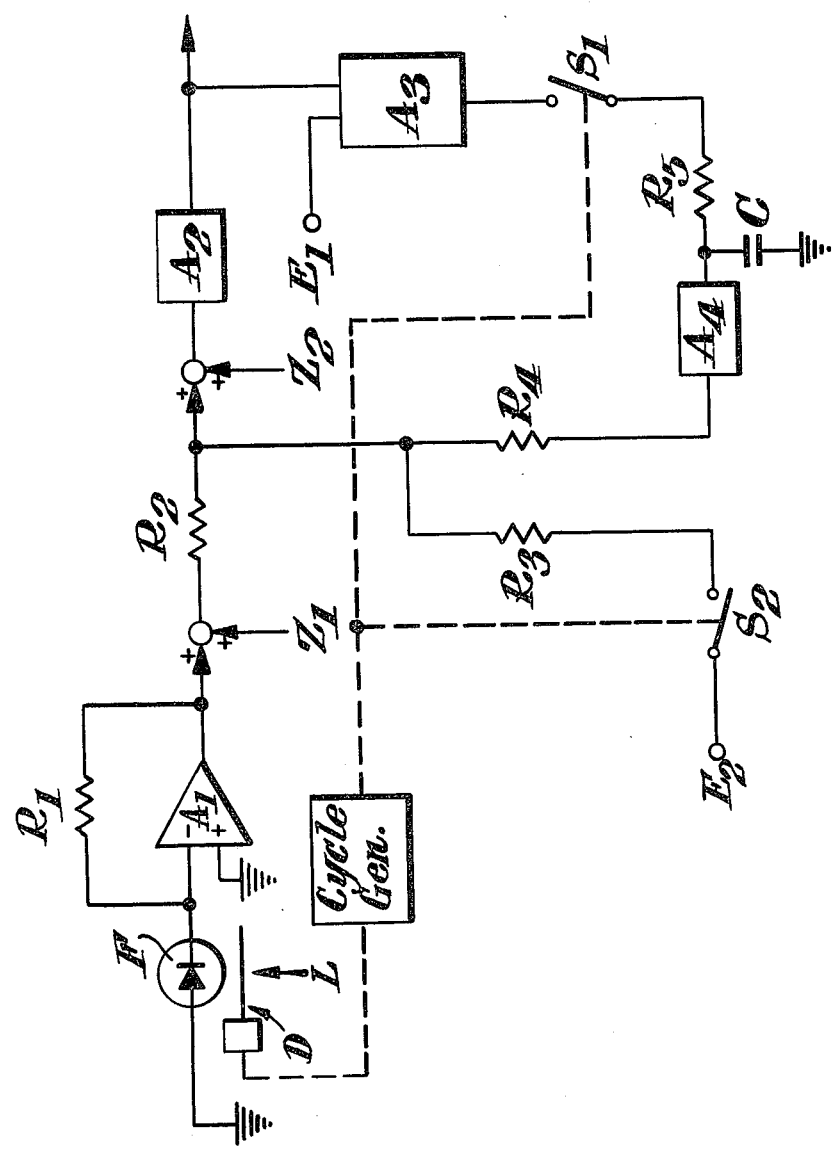

LIGHT MEASURING CIRCUIT FOR A PHOTOMETER

BACKGROUND OF THE INVENTION

This invention relates to a circuit arrangement for a photometer with a photocell, which is alternately shielded and exposed to light incidence by a darkening device and whose signal is amplified by an amplifier connected to a logarithmic amplifier. U.S. Pat. No. 3,892,493 describes a photometric process, and a photometer operating in accordance with this process, wherein a compensation takes place of the errors occurring in a photocell and in a measuring signal amplifier. For this purpose, the photocell is screened in an alternating sequence by a darkening device from the incidence of light and then freed. The signal occurring in the darkened phase being composed of pure error constituents which are stored. The stored signal is placed in opposition to the measuring signal in the actual measuring phase during which the photocell is freed and exposed to the measuring light, so that the measuring light is free of error constituents. In an exemplary embodiment described in such patent, this measuring signal is fed to a logarithmic amplifier, and in this manner a logarithmic indication is obtained, as it is needed in numerous applications in photographic technology. Such logarithmic amplifiers generally have a very good response with reference to their transmission function. Should light of very low intensity factors be measured, however, the errors primarily emanating from the input voltage drift of the logarithmic amplifier are so great in proportion to the measuring signal that measurements with a circuit arrangement according to U.S. Patent 3,892,493 can no longer be carried out with sufficient accuracy.

The object of the invention is to provide a circuit arrangement for a photometer of the aforementioned type wherein the errors occurring due to the logarithmic amplifier exert no influence on the measuring results.

SUMMARY

In accordance with this invention a reference current is additionally supplied into the input of the logarithmic amplifier at the same time the signal compensating the error in the photocell is supplied to the circuit. The reference current corresponds to the current which would occur in the photocell for the lowest measurable intensity of illumination. A particularly effective form of this invention has a sum-and-difference amplifier, one of whose inputs is supplied by the output of the logarithmic amplifier and whose second input is supplied by a reference voltage. A suitable control loop contains a storage capacitor connected after the sum-and-difference amplifier and an impedance converter connected after the storage capacitor. The compensating and reference currents are controlled by switches synchronized with a light chopper mounted in front of the photocell. By means of the novel circuit arrangement it is achieved that even the smallest measuring signals are detectable, since all errors in the transmission members between the photocell and the measuring output are determined and compensated.

BRIEF DESCRIPTION OF THE DRAWINGS

Novel features and advantages of the present invention will become apparent to one skilled in the art from a reading of the following description in conjunction with the accompanying drawing wherein similar reference characters refer to similar parts and in which the single FIGURE is a schematic diagram showing one embodiment of this inventnion.

DESCRIPTION OF THE PREFERRED EMBODIMENT

A photocell, e.g. a photodiode F is connected at the negative input of an operational amplifier $A_1$, in whose feedback circuit is situated a resistor $R_1$ and whose output is connected by means of resistor $R_2$ with the input of a logarithmic amplifier $A_2$. The output of the logarithmic amplifier $A_2$ forms the measuring output at which the measuring signal is tapped and conducted to a (non-illustrated) indicating unit. The output of the logarithmic amplifier $A_2$ furthermore is connected with one of the inputs of a sum-and-difference amplifier $A_3$, at the second input of which is applied a constant reference voltage $E_1$. The output of the sum-and-difference amplifier $A_3$ is connectable by means of a switch $S_1$ and a resistor $R_5$ with the input of an impedance converter $A_4$ whose output feeds back by means of a resistor $R_4$ to the input of the logarithmic amplifier $A_2$. Provided between the resistor $R_5$ and the impedance converter $A_4$ is a storage element, e.g. a capacitor $C$ connected parallel to the feedback control loop containing the logarithmic amplifier $A_2$, the sum-and-difference amplifier $A_3$ and the impedance transformer $A_4$ as the principal elements. A further voltage source $E_2$ is connectable by means of a switch $S_2$ and a resistor $R_3$ also with the input of the logarithmic amplifier $A_2$.

Before photodiode F is provided a darkening device D, which in an alternating sequence screens it from the light L to be measured and frees it again. Synchronously with the screening and freeing of photodiode F, the preferably electronic switches $S_1$ and $S_2$ are actuated, preferably automatically, in such a manner that with a freed photodiode F, both switches are opened and the corresponding circuits interrupted.

The errors occurring in the described measuring circuit are drawn as disturbance variables in the circuit diagram. The disturbance variable $Z_1$ takes effect at the output of amplifier $A_1$, while the disturbance variable $Z_2$ sets in at the input of the logarithmic amplifier $A_2$. Disturbance variable $Z_1$ contains all errors which are caused by photodiode F and amplifier $A_1$. By the circuit arrangement disclosed in the already mentioned U.S. Pat. No. 3,892,493, a compensation of this disturbance variable is possible. Not taken into consideration and not compensated by the said circuit arrangement, however, is the disturbance variable $Z_2$, which is produced primarily by the voltage drift of the logarithmic amplifier $A_2$ and is uniquely taken into consideration by the circuit arrangement of the present invention.

The manner of operation of the circuit described is as follows: During the time in which the photodiode F is screened from incident light by the darkening device D, both switches $S_1$ and $S_2$ are closed. The signal appearing at the output of amplifier $A_1$ is a pure error signal because no light falls on photodiode F. By means of voltage source $E_2$ and resistor $R_3$, a reference current is fed into the input of the logarithmic amplifier. This reference current may correspond to the current resulting in photodiode F with respect to the smallest measurable light signal. The reference current produces at the output of the logarithmic amplifier $A_2$ a voltage $E_R$, which is applied by the above-described connection at the input of the sum-and-difference amplifier $A_3$. The voltage $E_1$ applied at the second input of the sum-and-difference amplifier $A_3$ is selected substantially equal to voltage $E_R$. At the output of the logarithmic amplifier $A_2$, therefore, appears a voltage signal which is produced on the one hand by the current effected by the disturbance variables $Z_1$ and $Z_2$ and on the other hand by the reference current. This voltage signal is compared in the sum-and-difference amplifier $A_3$ with the voltage $E_1$ and the difference from these two signals is amplified. This difference signal produces by means of the impedance converter $A_4$ and resistor $R_4$ a compensation current which counteracts the error current at the input of the logarithmic amplifier, whereby the voltage existing at its output is freed of error constituents and corresponds only to the fed-in reference current, which can represent the smallest measurable signal, as mentioned above. At the same time, the capacitor C, connected parallel to the feedback control loop, is also charged. Essential for a precise operation of the control loop is that the comparison of the actual signal with the theoretical value represented by voltage $E_1$ occurs after the logarithmic amplifier, at which, over the entire measuring range, a great output signal is available. This means that the sum-and-difference amplifier $A_3$ may have a relatively great input voltage drift without feeding an additional operational error into the circuit. In this manner, a moderately-priced construction may be used for the sum-and-difference amplifier $A_3$.

In the time in which the photodiode is freed and is exposed to the measuring light, it yields the measuring signal corresponding to the intensity of illumination, which signal is afflicted with the same errors, present in the darkened phase, at the input of amplifier $A_2$. Switches $S_1$ and $S_2$ are open; thus the reference current can no longer flow into the input of the logarithmic amplifier and also no signal control can then occur because the feedback control loop is interrupted. The compensating current flowing in the phase with screened photodiode, however, is fed by the storage capacitor C through the impedance converter $A_4$, so that at the output of the logarithmic amplifier there appears only the measuring signal corresponding to the light falling on the photodiode.

The darkening device required for the functioning of this invention is known and is, therefore, not described or illustrated herein in detail.

I claim:

1. In a light measuring circuit having a photocell for generating an electrical signal when light impinges upon it, a darkening device disposed in front of the photocell for alternately shielding the photocell from the impinging light and uncovering it for exposure to the light in a cyclic sequence, the photocell being electrically connected to an indicating circuit and to a signal storage means, a first switching means connected to the signal storage means whereby signals are alternately stored and discharged into the indicating circuit, a cycle generating means connected to the darkening device and to the first switching means whereby signals are stored in the signal storage means when the darkening device shields the light from the photocell and signals are discharged into the indicating circuit when the photocell is exposed to light, the indicating circuit including an amplifier having an input and an output, the output of the amplifier being connected to a logarithmic amplifier in the indicating circuit, the improvement comprising a feedback control loop connecting the output of the logarithmic amplifier to feed back into the indicating circuit, a second switching means being connected in the feedback control loop, the signal storage circuit also being connected in the feedback control loop, a reference current source being connected to the indicating circuit.

2. A light measuring circuit as set forth in claim 1, wherein the reference current substantially corresponds to the current resulting in the photocell with respect to the lowest measurable intensity of illumination.

3. A light measuring circuit as set forth in claim 2, wherein the feedback control loop also contains a sum-and-difference amplifier having first and second inputs, to the first input is applied the output voltage of the logarithmic amplifier, and at the second input is applied a reference voltage.

4. A light measuring circuit as set forth in claim 3, wherein the reference voltage corresponds to the voltage which originates at the output of the logarithmic amplifier if a current is fed into its input which corresponds to the reference current.

5. A light measuring circuit as set forth in claim 1, wherein the signal storage means includes a storage capacitor connected to the feedback control loop after the sum-and-difference amplifier.

6. A light measuring circuit as set forth in claim 5, wherein an impedance converter is arranged in the feedback control loop after the signal storage means.

7. A light measuring circuit as set forth in claim 1, wherein the second switching means is arranged before the logarithmic amplifier.

8. A light measuring circuit as set forth in claim 1, wherein with a shielded photocell, the first and second switching means are closed and thus the reference current is switched on into the indicating circuit and with an unshielded photocell the switching means are open whereby the reference current is turned off and the feedback control loop is interrupted.

9. A light measuring circuit as set forth in claim 1, wherein the photocell is a photodiode.

10. A light measuring circuit as set forth in claim 1, wherein the feedback control loop is connected between the amplifier and the logarithmic amplifier.

* * * * *